US010302740B2

(12) United States Patent
Fuchs et al.

(10) Patent No.: US 10,302,740 B2
(45) Date of Patent: May 28, 2019

(54) SYSTEM AND METHOD FOR FAST ADAPTIVE RANGE DOPPLER COMPRESSION

(71) Applicant: RAYTHEON COMPANY, Waltham, MA (US)

(72) Inventors: Michael D. Fuchs, Redondo Beach, CA (US); Carolyn Moore, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 365 days.

(21) Appl. No.: 15/239,700

(22) Filed: Aug. 17, 2016

(65) Prior Publication Data

US 2018/0052220 A1    Feb. 22, 2018

(51) Int. Cl.
| G01S 7/32 | (2006.01) |
| G01S 13/28 | (2006.01) |
| G01S 13/30 | (2006.01) |
| G01S 7/292 | (2006.01) |
| G01S 13/524 | (2006.01) |

(52) U.S. Cl.
CPC .............. *G01S 7/2922* (2013.01); *G01S 7/32* (2013.01); *G01S 13/282* (2013.01); *G01S 13/288* (2013.01); *G01S 13/30* (2013.01); *G01S 13/5244* (2013.01)

(58) Field of Classification Search
CPC ........ G01S 7/2922; G01S 7/2927; G01S 7/32; G01S 13/28; G01S 13/282; G01S 13/288; G01S 13/5244
See application file for complete search history.

(56) References Cited

U.S. PATENT DOCUMENTS

| 4,713,664 A | * | 12/1987 | Taylor, Jr. | ........... G01S 13/5248 |
| | | | | 342/160 |
| 5,173,706 A | * | 12/1992 | Urkowitz | ................ G01S 7/032 |
| | | | | 342/101 |
| 5,416,488 A | * | 5/1995 | Grover | ................... G01S 7/2927 |
| | | | | 342/109 |
| 5,465,095 A | * | 11/1995 | Bryant | ................ G01S 13/5244 |
| | | | | 342/159 |

(Continued)

OTHER PUBLICATIONS

Blunt, Shannon K. et al.; "Adaptive Pulse Compression via MMSE Estimation"; IEEE Transactions on Aerospace and Electronic Systems; Apr. 2006; 42 (2); pp. 572-584.

(Continued)

*Primary Examiner* — Peter M Bythrow
(74) *Attorney, Agent, or Firm* — Lewis Roca Rothgerber Christie LLP

(57) ABSTRACT

System and method for adaptive target estimation in a radar system include: receiving a range-Doppler map (RDM) of a plurality of radar return signals; detecting N strongest signals in the RDM, wherein N is an integer greater than zero; removing the detected N strongest signals from the RDM by orthogonalizing the data in the RDM; storing information about the removed N strongest signals in a memory; repeating the steps of detecting, removing, and storing until a stopping criteria is met; when the stopping criteria is met, repopulating the RDM with the stored information about N strongest signals in the RDM to obtain a final RDM; and detecting targets using the final RDM.

20 Claims, 7 Drawing Sheets

(56) References Cited

U.S. PATENT DOCUMENTS

| | | | | |
|---|---|---|---|---|
| 5,617,099 A * | 4/1997 | Warren | | G01S 13/5244 342/159 |
| 6,937,185 B1 * | 8/2005 | Collazo | | G01S 13/5244 342/159 |
| 7,298,315 B2 * | 11/2007 | Gerlach | | G01S 7/292 342/159 |
| 7,439,906 B1 * | 10/2008 | Blunt | | G01S 13/28 342/134 |
| 7,474,257 B2 * | 1/2009 | Blunt | | G01S 7/292 342/134 |
| 7,535,412 B1 * | 5/2009 | Blunt | | G01S 7/2921 342/175 |
| 2003/0174088 A1 * | 9/2003 | Dizaji | | G01S 7/2927 342/93 |
| 2006/0097909 A1 * | 5/2006 | Blunt | | G01S 7/292 342/159 |
| 2008/0074310 A1 * | 3/2008 | Blunt | | G01S 13/284 342/189 |
| 2012/0139777 A1 * | 6/2012 | Hunter | | G01S 13/5242 342/175 |
| 2013/0201054 A1 * | 8/2013 | Wang | | G01S 13/0218 342/93 |
| 2013/0257645 A1 * | 10/2013 | Penney | | G01S 13/50 342/159 |
| 2015/0109165 A1 * | 4/2015 | Holder | | H04B 1/7097 342/159 |
| 2017/0102458 A1 * | 4/2017 | Schuman | | G01S 13/5244 |

OTHER PUBLICATIONS

Foreman, Terry L.; "Application of the CLEAN Detector to Low Signal to Noise Ratio Targets"; 2010 IEEE International Radar Conference (9th), May 2010; pp. 150-155.

* cited by examiner

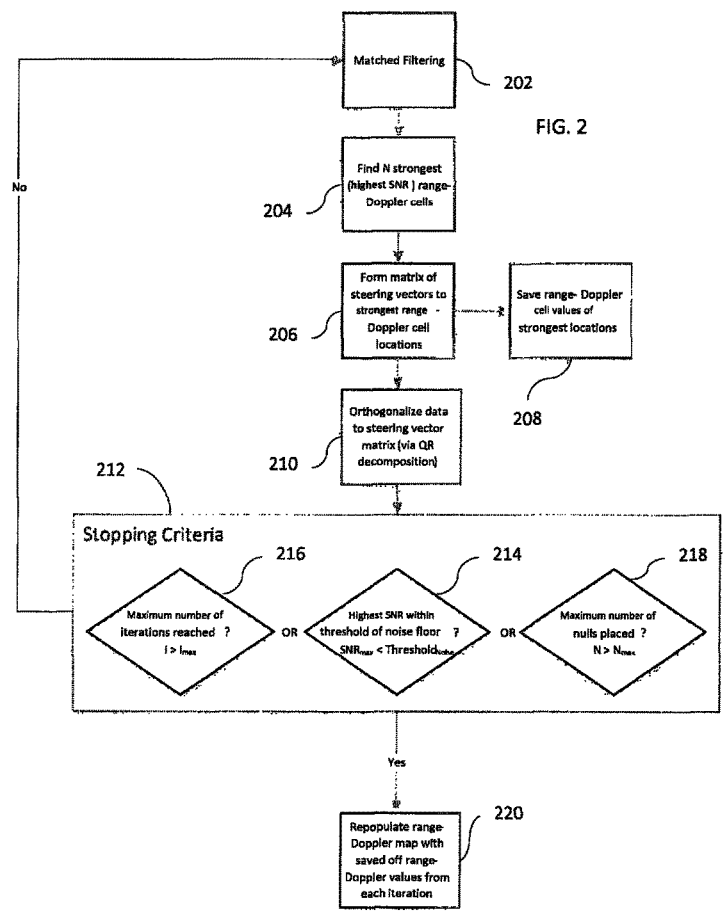

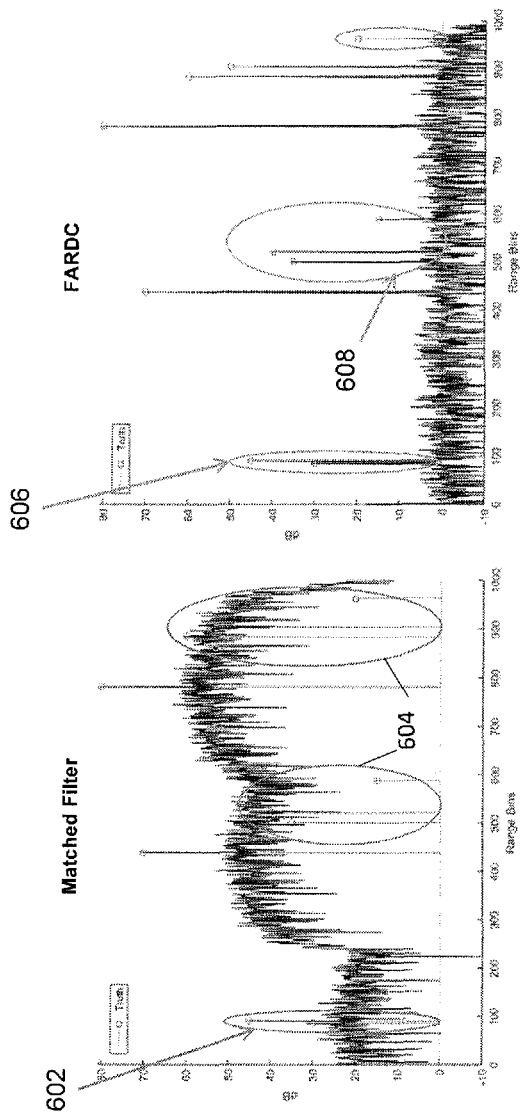

SYSTEM AND METHOD FOR FAST ADAPTIVE RANGE DOPPLER COMPRESSION

FIELD OF THE INVENTION

The disclosed invention relates generally to radars and target estimation and more specifically to system and method for fast adaptive range Doppler compression.

BACKGROUND

A typical radar system includes a powerful transmitter and sensitive receiver normally connected to the same antenna. After producing a brief pulse of radio signal, the transmitter is turned off for the receiver to receive the reflections of pulse signal off distant targets. Thus, the radar receives a return signal that is a superposition of reflections from each target, each reflection being a time delayed and scaled version of the transmitted pulse. In a simple realization, the transmitted pulse is simply a constant amplitude and frequency sinusoid that is rapidly switched on and off. This is commonly referred to as a CW (continuous wave) pulse. However, this waveform has significant limitations. If the range difference between two targets is small enough that the difference in their reflection delays is less than the pulse duration, their reflections will overlap and the radar will not be able to resolve them as separate targets. Thus, it is desirable to make the pulse duration as short as possible. Moreover, the maximum range at which a target is detectable depends on the energy transmitted in the pulse, which is proportional to the product of the pulse amplitude and pulse duration. Thus if pulse duration is decreased, pulse amplitude must be increased to maintain detection range, but there are practical limitations to how much amplitude (and corresponding transmit power) can be increased.

An alternative approach is to transmit a relatively long pulse, but to modulate it in some way. This allows closely separated targets to be resolved even though their reflections overlap by means of appropriate signal processing. Such techniques are generically referred to as pulse compression, since in effect they compress a long duration modulated pulse to provide resolution comparable to a much shorter CW pulse. A commonly used pulse compression technique employs a matched filter (MF) technique, in which, a replica of the transmitted pulse is correlated with the return signal over the range of potential target delays. This processing produces a signal consisting of delayed and scaled versions of the transmitted pulse autocorrelation function (where the delays correspond to the round-trip propagation time for each target and the scaling depends on the reflection strength for each target), plus random background noise. Thus, by choosing a transmit waveform having an autocorrelation function, that is a narrow pulse, the matched filter output produces signal spikes corresponding to target ranges.

An ideal transmit waveform would have an impulse autocorrelation function with a finite value at zero delay, and zero elsewhere). However, such a waveform is not physically realizable and practical waveforms only approximate this ideal to various degrees. A commonly used example is the FM chirp, in which, frequency is linearly swept over time. This produces an autocorrelation function such as illustrated in FIG. 1A, which has a strong peak (or main lobe) surrounded by smaller peaks (side lobes) whose amplitudes rapidly decay away from the main lobe.

Another alternative is to use a pseudo-random noise (P-N) pulse, in which, a pseudo-random noise process is used to vary the amplitude and phase of a sinusoidal carrier wave. FIG. 1B shows an example autocorrelation function for such a random phase waveform. Like the FM chirp, this autocorrelation technique has a strong main lobe peak, but the side lobes remain more uniformly high away from the main lobe. This means that weaker targets may be buried in the side lobes of stronger targets, even if range (delay) separation between them is large. Despite this, using P-N may still be desirable, for instance, to make detection of the radar signal by hostile observers more difficult.

Another factor to consider is that targets and/or the radar may be in motion, so that target range may be changing at a non-zero rate. This results in a Doppler shift, i.e., a difference between the frequencies of the transmitted signal and the received target reflection. Absent compensation, this Doppler shift may degrade MF performance, since the Doppler effectively adds frequency modulation that de-correlates the return signal. Thus, some means of estimating and compensating Doppler frequency is desirable. In addition, Doppler estimates provide useful information in their own right, since they indicate the rate at which target range is opening or closing. Consequently, the problem of jointly estimating range and Doppler for a multiplicity of targets is of key importance in many radar systems.

Moreover, in modem radar systems with multiple target detection capability, high sidelobe levels of strong targets or clutter can mask the presence of weaker targets in the range-Doppler space. This problem is worsened when using non-standard radar waveforms (e.g. P-N sequences) since the masking problem is exacerbated by use of non-standard waveforms, with poor sidelobe properties and Doppler intolerance.

There have been many approaches to estimate range-Doppler of radar returns. For example, Doppler compensated matched filters are commonly used. However, the effectiveness of this approach depends on the transmit waveform autocorrelation properties, for example, the uniformly high range side-lobes associated with P-N waveforms limit the ability to detect weak targets in the presence of strong targets. Also, since the weights of the matched filters need to be dynamically adjusted, a complex and costly computation is needed. Various minimum mean square error (MMSE) algorithms have been proposed to mitigate these range side-lobes. These algorithms postulate a mathematical model, that is, a function that maps certain unknown input variables (such as target delay, Doppler, and amplitude) to a model output that predicts the actual observed data. Because of random measurement errors the actual observations generally do not exactly match the model outputs, even if the inputs are correct.

A more recently developed single pulse imaging (SPI) method explicitly considers both Doppler and range estimation. However, this method is limited by the assumption that the number of transmit pulse samples is substantially less than the number of range bins. The SPI method also requires a series of matrix inversion operations with dimension equal to the transmit pulse sample length, which are also computationally intensive and complex.

Accordingly, there is a need for a more efficient, less computationally complex, and higher quality approach to estimate range-Doppler of radar returns, especially, when the radar waveforms are non-traditional or arbitrary radar waveforms.

SUMMARY

Some embodiments of the disclosed invention adaptively identify strong targets in a range-Doppler map, save their values and locations in the range-Doppler map, and then remove them via a novel and efficient nulling approach in order to detect signals/targets that are not detectable or resolvable with a single matched filtering operation. The disclosed invention then uses a second iteration to detect and suppress the next strong targets in the range-Doppler map. The iterations for subsequent strong target detection and suppression are continued until a stopping criteria is reached. The final dynamically developed rage-Doppler map will optimally include information about all of the targets.

In some embodiments, the disclosed invention is a method for adaptive target estimation in a radar system. The method includes: receiving a range-Doppler map (RDM) of a plurality of radar return signals; detecting N strongest signals in the RDM, wherein N is an integer greater than zero; removing the detected N strongest signals from the RDM by orthogonalizing the data in the RDM; storing information about the removed N strongest signals in a memory; repeating the steps of detecting, removing, and storing until a stopping criteria is met; when the stopping criteria is met, repopulating the RDM with the stored information about N strongest signals in the RDM to obtain a final RDM; and detecting targets using the final RDM.

In some embodiments, the disclosed invention is a system for adaptive target estimation. The system includes: a receiver for receiving a range-Doppler map (RDM) of a plurality of radar return signals; and a processor for: detecting N strongest signals in the RDM, wherein N is an integer greater than zero, removing the detected N strongest signals from the RDM by orthogonalizing the data in the RDM, storing information about the removed N strongest signals, repeating the detecting, the removing, and the storing, until a stopping criteria is met, when the stopping criteria is met repopulating the RDM with the stored information about N strongest signals in the RDM to obtain a final RDM, and detecting targets using the final RDM.

In some embodiments, the RDM is obtained from a matched filter. Moreover, detecting N strongest signals may comprise of detecting N signals with strongest signal-to-noise ratio, or with power greater than a predetermined threshold. N may be dynamically determined based on the received data, or set to a predetermined value.

BRIEF DESCRIPTION OF THE DRAWINGS

These and other features, aspects, and advantages of the disclosed invention will become better understood with regard to the following description, appended claims, and accompanying drawings.

FIG. 2 is an exemplary process flow diagram of a target detection and range-Doppler compression system, according to some embodiments of the disclosed invention.

FIGS. 6A and 6B show a comparison of the resulting target detection for a traditional matched filter approach and the approach according to some embodiments of the disclosed invention.

DETAILED DESCRIPTION

Figure 1A:
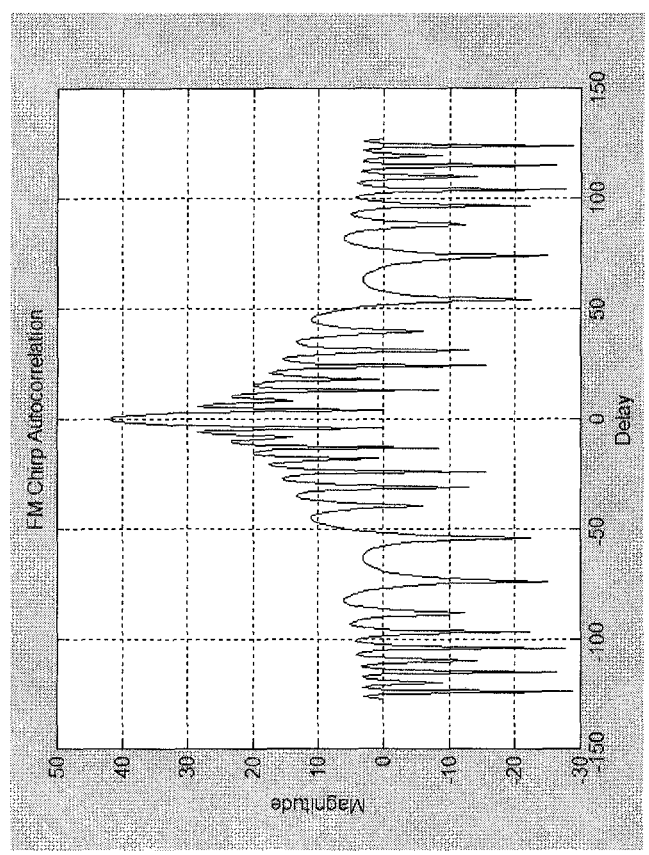
FIG. 1A is a graph for a typical FM chirp autocorrelation function.
Figure 1B:
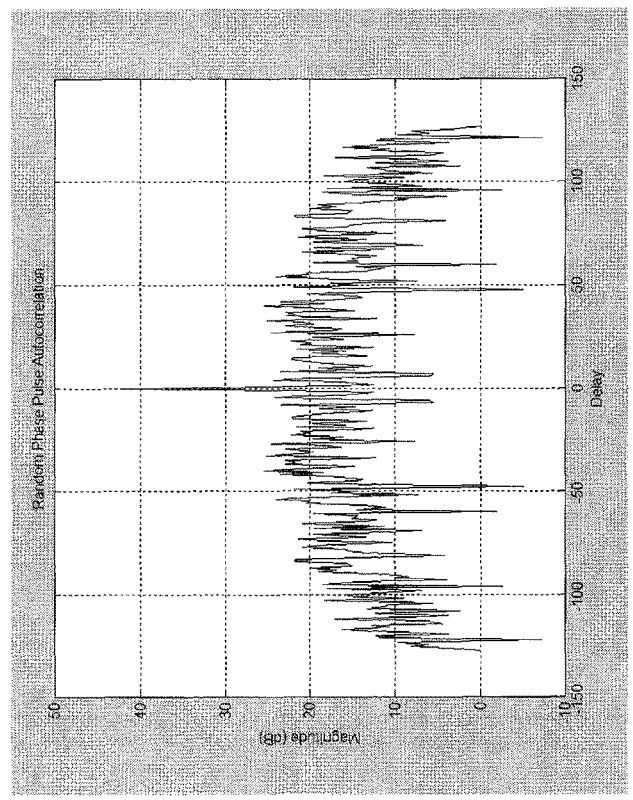
FIG. 1B is a graph for a typical pseudo-random noise modulation autocorrelation function.

In some embodiments, the disclosed invention uses an iterative process that efficiently detects strong targets and masked weak targets, especially for non-standard radar waveforms. This greatly increases the number of targets successfully detected by a radar system.

In some embodiments, the disclosed invention is a system and method for fast adaptive range Doppler compression (FARDC) to detect multiple weak and strong targets. This allows for joint range-Doppler processing in support of Doppler intolerant waveforms, such as P-N sequences, without incurring any mismatch loss. In some embodiments, the disclosed invention iteratively detects strong return signals (e.g., targets, distributed and discrete ground clutter) in the range-Doppler map, cancels (nullifies) them enabling the detection of the weaker (next strong) returns, and retains information on the cancelled (nullified) return signals (for example, SNR and location in the range-Doppler map) from iteration to iteration.

In some embodiments, the disclosed invention utilizes a data-domain QR decomposition approach, rather than a conventional covariance-based implementation, to orthogonalize the data, resulting in a computationally efficient implementation. As used herein, a QR decomposition of a matrix is a decomposition of a matrix A into a product A=QR of an orthonormal matrix Q and an upper triangular matrix R. QR decomposition is often used to solve the linear least squares problem, and is the basis for a particular eigenvalue algorithm, the QR algorithm.

The system and method of the disclosed invention may be used in a variety of different applications, such as radar applications including target detection, target characterization, target processing, navigation, sidelobe reduction in SAR processing, and other imaging applications.

In some embodiments, the disclosed invention identities signals within a dynamic threshold of the maximum value in a matched filter output. It then saves these values and locations, and removes them (nulls strong targets) by orthogonalizing the original data to their locations in measurement space (e.g. range, Doppler, angle). Orthogonalization is the process of finding a set of orthogonal vectors that span a particular subspace. Starting with a linearly independent set of vectors $\{v_1, \ldots, v_k\}$ in an inner product space, orthogonalization results in a set of orthogonal vectors $\{u_1, \ldots, u_k\}$ that generate the same subspace as the vectors $v_1, \ldots, v_k$. But, every vector in the new set is orthogonal to every other vector in the new set, while both sets have the same linear span. The disclosed invention uses this concept to remove strong signals from the data by orthogonalizing the data to the range and doppler shifted waveform-based model of the detected strong signals on every iteration.

In some embodiments, this orthogonalization is accomplished using a QR decomposition, which enables faster implementation than a traditional adaptive weight application for a large sample space, which require large matrix multiplications. This process is repeated until certain stopping criteria are met. In some embodiments, the stopping criteria includes one or more of the following: when a maximum number of iterations is reached; when no more targets/signals higher than a specified threshold are found (to avoid nulling noise); and when a maximum number of signals have been nulled. The stopping criteria may vary based on the needs of the given application. For example, if it is most important to detect as many targets above the noise floor as possible, then the second criteria would be applied. If run time and processing resource limitations are more of a concern, then the first or the third criteria might be used.

The disclosed invention can be applied to one dimensional problems (e.g., range only, Doppler only, angle only) as well as higher dimensional applications (e.g., range-Doppler, range-Doppler-angle).

FIG. 2 is an exemplary process flow diagram of a target detection and range-Doppler compression system, according to some embodiments of the disclosed invention. As depicted in block 202, an RDM is formed for each iteration via match filtering. On the first iteration, matched filtering is performed on the digitized received radar signal. On each subsequent iteration, matched filtering is performed on the orthogonalized data resulting from the previous iteration. In block 204, on each iteration, a set of N strongest signals in the range Doppler map (RDM) are detected. In some embodiments, N signals with the strongest signal-to-noise ratio (SNR) are identified. N can be dynamically determined based on the data itself (e.g., N=strongest 10% of detections, N=total number of detections, N=all detections above a given SNR/power threshold, etc.), or can be set in advance as a static number based on knowledge of what is reasonable to the application (e.g. N=20). In some embodiments, nulls are placed at the location of these N signals in the current RDM.

In block 206, a matrix of steering vectors to the strongest range-Doppler locations (cells) in the RDM is formed (calculated). That is, a steering matrix to the range-Doppler location of nulls for the current iteration along with null locations from all previous iterations is formed. For example, the matrix of null steering vectors is formed for null locations on the first iteration. For the second iteration, new null steering vectors for the additional target locations to be nulled are appended to the null steering matrix from the previous iteration, etc. The RDM cell values of the strongest signals (RDM locations being nulled) is then saved in memory (block 208) for final compilation of the full RDM (block 220). For example, strong target power(s) from previous iteration where nulls will be placed in the next iteration are saved in the memory so that they can ultimately be incorporated into a final RDM.

In block 210, the digitized received radar data, X, is orthogonalized to the steering vector matrix to nullify the N strongest signals in the range-Doppler map. In some embodiments, a QR decomposition, which enables faster implementation than a traditional adaptive weight application, is utilized to orthogonalize the data. For example, data X is orthogonalized to the matrix of steering vectors to each null, essentially removing the strongest targets which are artificially raising the noise floor to their sidelobe level. These steps (blocks 206 and 210) are summarized by the following exemplary pseudo code:

Vnull=[Vnull$_1$ ... Vnull$_{i-1}$ Vnull$_i$], where Vnull$_i$ is a matrix of steering vectors to each null in range-Doppler space for iteration i
P=[Vnull X]
[Q,R]=qr (P);
X$_{orth\_i}$=Q(:,end)*R(end,end)

A RDM is formed for each iteration as $Z_i = V^H X_{orth\_i}$, where V is the original matrix of steering vectors to all range-Doppler space, and H is the conjugate transpose operation. In sonic embodiments, the matched filter weights (V) remain constant (range-Doppler steering vector/matrix) while the data itself is modified (orthogonalized) on each iteration. In some embodiments, regions (signals) to be nullified are identified as portions of the RDM with power greater than a given threshold (e.g. 10 dB). In some embodiments, regions of range-Doppler space to be nullified are identified by applying a dynamic threshold (e.g. −10 dB) set relative to the strongest signal detected in the RDM during each iteration. Using QR decomposition to orthogonalize the data to only the strongest targets on each iteration eliminates the processing intensive matrix multiplication operations to form adaptive weights that the traditional adaptive approaches require. In sonic embodiments, the QR operation only uses the steering vectors for the N targets to be milled on each iteration, rather than the full range-Doppler space steering vectors.

In block 212, one or more stopping criteria are checked to determine whether sufficient iterations on the data have been performed. If the stopping criteria has not been reached yet, the process returns to block 202 to detect and operate on the next strongest signals. When the stopping criteria has been reached, a final matched filtering operation is performed on the orthogonalized data from the final iteration to form an RDM with all nulls placed. This RDM is then re-populated in block 220 with saved range-Doppler values from each iteration to obtain a complete RDM of all the desired signals. For example, the invention reassembles a final RDM by replacing the nulled location (range-Doppler cells) values of the final stage RDM with the saved off values from previously nulled strong targets.

In this illustrative example, the stopping criteria may be one or more of whether a maximum (predetermined) number of iterations have been reach (block 216), whether the highest SNR in the RDMs is within a certain threshold of the noise floor (block 214), and/or whether a maximum number of nulls have been placed (block 218). Although, other stopping criteria, such as stopping when a certain percentage of the data has been nulled, may be used.

Figure 3:
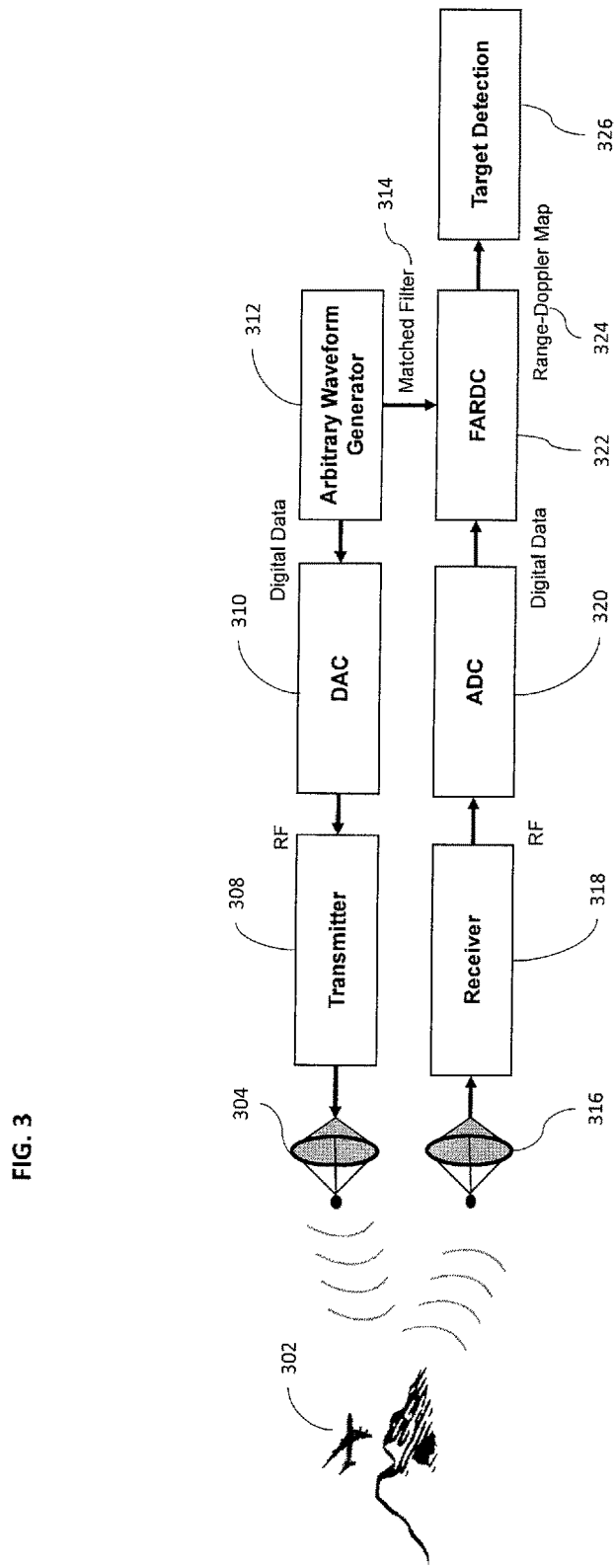
FIG. 3 is a simplified exemplary block diagram of a target detection and range-Doppler compression system, according to some embodiments of the disclosed invention.

FIG. 3 is a simplified exemplary block diagram of a target detection and range-Doppler compression system, according to some embodiments of the disclosed invention. As shown, a known radar (reference) signal is generated by the arbitrary waveform generator (AWG) 312, converted to an analog signal and modulated to the carrier (RF) frequency by a digital-to-analog converter (DAC) 310, and transmitted by a transmitter 308 through an antenna 304. The transmitted radar signal bounces of targets and clutters 302. The return signal is received through by a receiver 318 via an antenna 316. One skilled in the art would readily recognize that the antennas 304 and 316 may be the same antenna or two different antennas. The received signal is then digitized by an analog-to-digital converter (ADC) 320. In a typical radar system, matched filtering of the digitized received signal using the reference signal generated by the AWG 312 may be performed by a match filter 314. A fast adaptive range Doppler compression (FARDC) unit 322 iteratively performs matched filtering while adaptively nulling strong signals. The final output of FARDC unit 322 is a complete RDM including all detected signals from each iteration. The resulting RDM is then sent to a detection processing unit 326 to detect, recognize and/or track the target.

Figure 4:
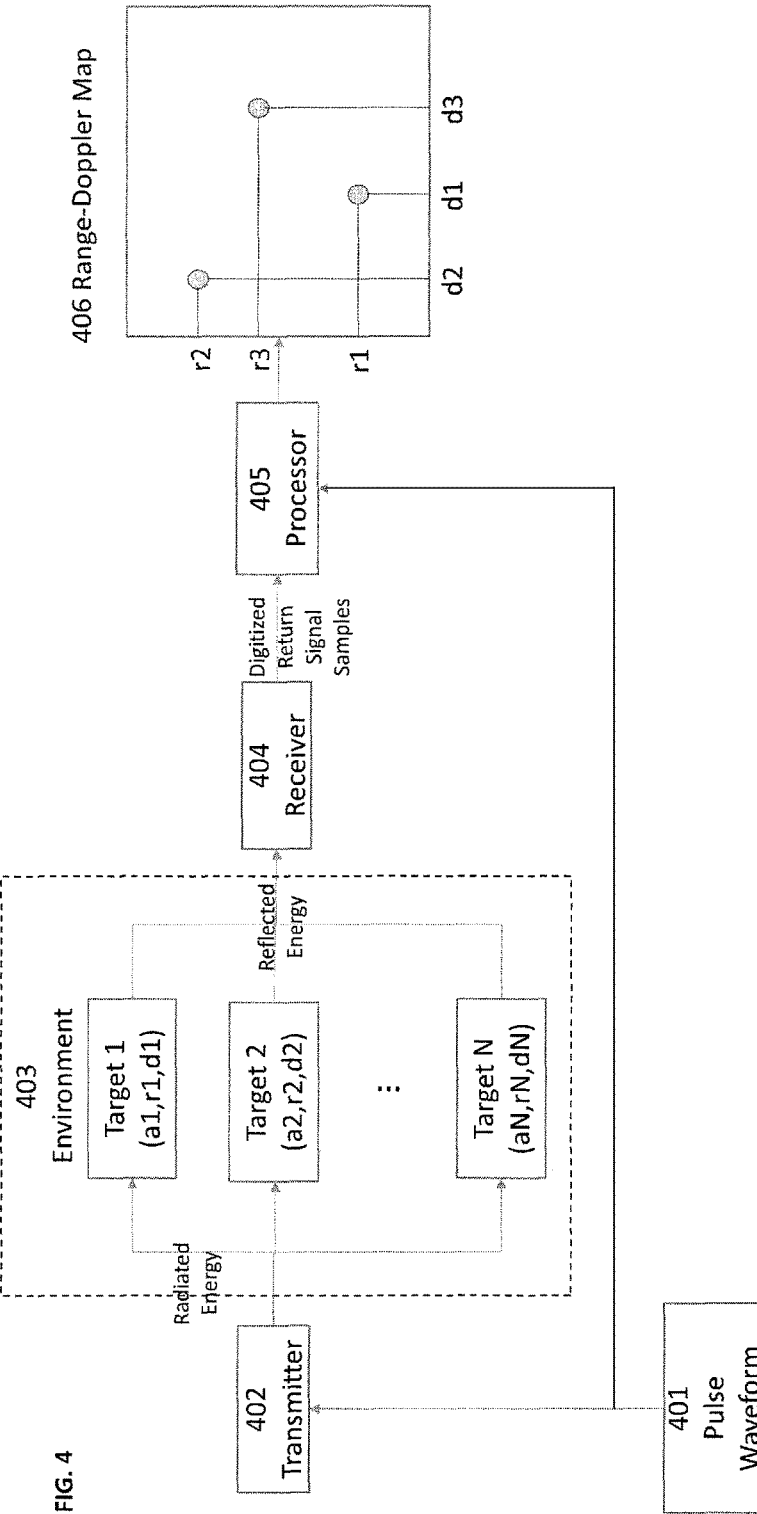
FIG. 4 is an exemplary block diagram of a target detection and range-Doppler compression system, according to some embodiments of the disclosed invention.

FIG. 4 is an exemplary block diagram of a target detection and range-Doppler compression system, according to sonic embodiments of the disclosed invention. As shown, a pulse waveform 401 is input to a transmitter 402. The pulse waveform 401 may be an arbitrary waveform such as known conventional radar waveforms or unconventional radar waveforms (such as a P-N sequence). Transmitter 402 applies the pulse waveform to modulate a carrier wave, which is amplified and then radiated into the environment 403 by an antenna. (not shown). The environment 403 contains a multiplicity of targets 1 to N (and possibly some clutter, such as ground returns or obstacles), each of which reflects a version of the transmitted signal to a receiver 404. Typically, the reflection from the kth target is scaled by an amplitude $a_k$, delayed by a range-dependent time interval $r_k$ and modulated by a Doppler shift $d_k$ dependent on the relative motion of the target. The reflected energy (signal) seen by the receiver 404 is the superposition of all of these targets reflections.

The receiver 404 amplifies the return signal, removes the carrier modulation, and digitizes the resulting baseband signal to provide a series of digitized sample values to a processor 405 to process the digitized sample values according to the disclosed invention. The processor detects the stronger targets and combines the sample data for such strong targets with digitized samples of the transmitted waveform to produce an RDM 406 by using matched filter weights obtained from the pulse waveform 401. Processor 405 then suppresses the detected strong targets in the RDM by using a QR approach to orthogonalize the received data (404) to the strong target locations. Processor 405 then iterates the above process for the next strong targets in the RDM 406 and repeats the iteration until one or more stopping criterion is reached. The processor 405 then reassembles a final RDM by accounting for the previously nulled strong targets.

Figure 5:
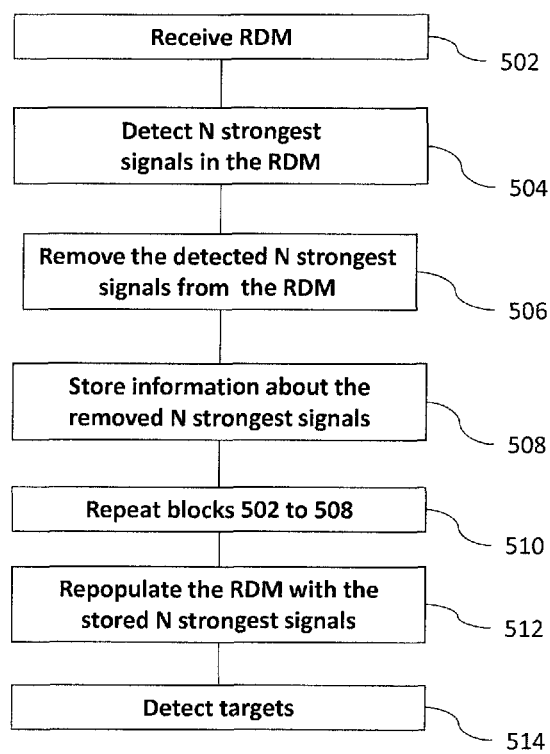
FIG. 5 is an exemplary process flow diagram for a method for adaptive target estimation in a radar system, according to some embodiments of the disclosed invention.

FIG. 5 is an exemplary process flow diagram for a method for adaptive target estimation in a radar system, according to sonic embodiments of the disclosed invention. As shown in block 502, a RDM of a plurality of radar return signals is received. In some embodiments, this RDM is obtained by performing matched filtering in range-Doppler space. The N strongest signals in the RDM are then detected, in block 504. For example, signals with strongest SNR or powers greater than a predetermined value are detected. In block 506, the detected N strongest signals are removed (nullified) from the RDM by orthogonalizing the data in the RDM. The orthogonalization may be accomplished by using a QR decomposition method. The information about each of the removed N strongest signals, for example, their SNR and their location in the RDM, are then stored in a memory, in block 508.

In block 510, the processes in blocks 502 to 508 are repeated using the previously generated RDM which includes the nulls, until a stopping criteria is met. When the stopping criteria is met, the RDM is repopulated with the stored. N strongest signals in the RDM to obtain a final RDM, in block 512. Targets are then detected using the final RDM, in block 514.

The resulting final RDM may be displayed on a display screen or more typically may be input to additional radar functional modules to detect and track individual targets. For example, a constant false alarm rate ((TAR) process may be used to set a target detection threshold applied to the RDM. Bins (cells) in the RDM, the values of which exceed this threshold, would be deemed to correspond to target detections, and the indices of these bins would map to range and Doppler of the targets, and their magnitudes would indicate target radar cross section. Detection and tracking of individual targets may be used in a variety of different applications, for example, for military or security purposes, for navigation of vehicles, aircrafts and ships, weather forecasting, monitoring the speed of vehicle, and the like.

FIGS. 6A and 6B show a simulation comparison of the resulting target detection for a traditional matched filter approach and the approach according to some embodiments of the disclosed invention. In this exemplary simulation, a pulsed noise waveform is used with 1000 samples and 1000 range bins for 10 targets with SNRs between 15 dB and 80 dB. A total of 5 iteration were performed. As shown in FIG. 6A, the matched filter approach has difficulty resolving the closely spaced targets (602). Even some strong targets are undetectable (604) due to the raised noise floor set by the strongest target. In contrast, as shown in FIG. 6B, the closely spaced targets are resolvable (606) and the weak targets are readily detectable (608). Similarly, for a continuous wave (CW) noise waveform, the maximum measured SNR output of the matched filter approach is limited by the time-bandwidth product of the noise waveform and thus noise estimate is corrupted by the target's sidelobes. The disclosed invention eliminates the noise floor corruption caused by high sidelobes, allowing for a linear SNR in vs. out measurement.

Furthermore, the system and method of the disclosed invention is much faster than the conventional methods because the disclosed invention adapts the data to null the strong targets, rather than adapting weights to the data on each iteration. Some embodiments of the invention use QR decomposition to orthogonalize the data to desired directions (locations of strong targets), such that the dimensionality of the problem is only as high as the number of signals that need to be mitigated.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

The invention claimed is:

1. A method for adaptive target estimation in a radar system, the method comprising:
   a. receiving a range-Doppler map (RDM) of a plurality of radar return signals;
   b. detecting N strongest signals in the RDM, wherein N is an integer greater than zero;
   c. removing the detected N strongest signals from the RDM by orthogonalizing the data in the RDM to strongest target locations;
   d. storing information about the removed N strongest signals in a memory;
   e. repeating the steps of detecting, removing, and storing until a stopping criteria is met;
   f. when the stopping criteria is met, repopulating the RDM with the stored information about N strongest signals in the RDM to obtain a final RDM; and
   g. detecting targets using the final RDM.

2. The method of claim 1, wherein receiving the RDM comprises obtaining the RDM from a matched filter.

3. The method of claim 1, wherein detecting N strongest signals comprises detecting N signals with strongest signal-to-noise ratio.

4. The method of claim 1, wherein detecting N strongest signals comprises detecting N signals with power greater than a predetermined threshold.

5. The method of claim 1, wherein N is dynamically determined based on the received data.

6. The method of claim 1, wherein N is a predetermined value.

7. The method of claim 1, wherein orthogonalizing the data in the RDM comprises orthogonalizing the data to a steering matrix, wherein the steering vector is calculated by forming a matrix of steering vectors to the strongest range-Doppler locations in the RDM.

8. The method of claim 1, further comprising using a QR decomposition to orthogonalize the data in the RDM.

9. The method of claim 1, wherein storing information about the removed N strongest signals comprises storing a signal-to-noise ratio and a location in the RDM for each of the removed N strongest signals.

10. The method of claim 1, wherein the stopping criteria includes one or more of: when a maximum number of iterations is reached, when no more targets or signals higher than a specified threshold are detected, and when a predetermined maximum number of signals have been removed.

11. The method of claim 1, further comprising displaying the final RDM on a display screen.

12. A system for adaptive target estimation comprising:
   a. a receiver for receiving a range-Doppler map (RDM) of a plurality of radar return signals; and
   b. a processor for:
      i. detecting N strongest signals in the RDM, wherein N is an integer greater than zero;
      ii. removing the detected N strongest signals from the RDM by orthogonalizing the data in the RDM to strongest target locations;
      iii. storing information about the removed N strongest signals;
      iv. repeating the detecting, the removing, and the storing, until a stopping criteria is met;
      v. when the stopping criteria is met, repopulating the RDM with the stored information about N strongest signals in the RDM to obtain a final RDM; and
      vi. detecting targets using the final RDM.

13. The system of claim 12, wherein the processor detects the N strongest signals by detecting N signals with strongest signal-to-noise ratio.

14. The system of claim 12, wherein the processor detects the N strongest signals by detecting N signals with power greater than a predetermined threshold.

15. The system of claim 12, wherein N is dynamically determined based on the received data.

16. The system of claim 12, wherein N is a predetermined value.

17. The system of claim 12, wherein the processor orthogonalizes the data in the RDM by orthogonalizing the data to a steering matrix, wherein the steering vector is calculated by forming a matrix of steering vectors to the strongest range-Doppler locations in the RDM.

18. The system of claim 12, wherein the processor orthogonalizes the data in the RDM by using a QR decomposition.

19. The system of claim 12, wherein the processor stores a signal-to-noise ratio and a location in the RDM for each of the removed N strongest signals.

20. The system of claim 1, wherein the stopping criteria includes one or more of: when a maximum number of iterations is reached, when no more targets or signals higher than a specified threshold are detected, and when a predetermined maximum number of signals have been removed.

* * * * *